United States Patent
Byrne

(10) Patent No.: US 11,375,348 B2
(45) Date of Patent: Jun. 28, 2022

(54) NON-REAL-TIME STORE AND FORWARD OF INTERNET OF THINGS SENSOR DATA

(71) Applicant: T-Mobile USA, Inc., Bellevue, WA (US)

(72) Inventor: Cameron Byrne, Seattle, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 16/917,750

(22) Filed: Jun. 30, 2020

(65) Prior Publication Data

US 2021/0409912 A1    Dec. 30, 2021

(51) Int. Cl.
| | |
|---|---|
| *H04W 4/38* | (2018.01) |
| *H04W 4/024* | (2018.01) |
| *H04W 24/08* | (2009.01) |
| *H04W 84/18* | (2009.01) |

(52) U.S. Cl.
CPC ............ *H04W 4/38* (2018.02); *H04W 4/024* (2018.02); *H04W 24/08* (2013.01); *H04W 84/18* (2013.01)

(58) Field of Classification Search
CPC ....... H04W 4/38; H04W 24/08; H04W 4/024; H04W 84/18
See application file for complete search history.

(56) References Cited

U.S. PATENT DOCUMENTS

| | | | | |
|---|---|---|---|---|
| 2016/0323839 | A1* | 11/2016 | Davis | H04L 41/12 |
| 2019/0354734 | A1* | 11/2019 | Forster | G06K 19/0723 |
| 2021/0084563 | A1* | 3/2021 | Ogura | H04B 7/2606 |
| 2021/0162950 | A1* | 6/2021 | Larsen | G08B 13/04 |

OTHER PUBLICATIONS

Author Unknown, Wikipedia, "Automatic meter reading," https://en.wikipedia.org/wiki/Automatic_meter_reading, 5 pages, Feb. 2, 2020.
Author Unknown, Wikipedia, "Smart meter," https://en.wikipedia.org/wiki/Smart_meter, 8 pages, Mar. 19, 2020.

* cited by examiner

*Primary Examiner* — Said M Elnoubi
(74) *Attorney, Agent, or Firm* — Brownstein Hyatt Farber Schreck, LLP

(57) ABSTRACT

A mobile sensor reader for Internet of Things (IoT) devices includes a wireless communications system, a memory configured to store sensor data received via the wireless communications system from an IoT device, and a processor. The processor is configured to monitor for remote electronic data collectors that come within a communication range of the wireless communications system as at least one of the mobile sensor reader or one of the remote electronic data collectors move to different locations; determine a first parameter of a remote electronic data collector that has come within the communication range of the wireless communications system; determine a second parameter of the mobile sensor reader or the sensor data; and forward the sensor data to the remote electronic data collector, via the wireless communications system, at least partly in response to the first parameter and the second parameter satisfying a set of one or more conditions.

15 Claims, 6 Drawing Sheets

NON-REAL-TIME STORE AND FORWARD OF INTERNET OF THINGS SENSOR DATA

FIELD

Embodiments described herein relate to wirelessly reading sensor data from Internet of Things (IoT) devices using a mobile sensor reader, and to forwarding the sensor data, in non-real-time, from the mobile sensor reader to a server or cloud node. The sensor data may be forwarded to the server or cloud node via a set of intermediary, and in some cases mobile (or roving), electronic data collectors.

BACKGROUND

A municipality or other entity may need to collect data from a multitude of "things" that are not connected to a network. For example a municipality may need to collect readings from gas meters. Conventionally, gas meters may be read by a person carrying a handheld device (a meter reader). When the meter reader is brought close to the gas meter, a meter reading may be collected from the gas meter by the meter reader. More recently, the range of meter readers has been extended so that the meter reader just needs to be driven within a wireless communication range of the gas meter to collect a reading. However, meter reading is still performed by a specially-deployed force of people and fleet of vehicles.

A conventional alternative to reading meters using meter readers is to provide a much smarter and more expensive meter that incorporates a cellular modem or the like. The meter may then periodically connect to a cellular network and upload a meter reading over a cellular communications network.

SUMMARY

This summary is provided to introduce a selection of concepts, in simplified form, that are further described in other sections. This summary is not intended to identify key features or essential features of the claimed subject matter, nor is it intended to be used as an aid in determining the scope of the claimed subject matter.

Described herein are unique systems, methods, devices, and apparatus that enable sensor data to be wirelessly read from IoT devices and forwarded, in non-real-time, to a server or cloud node. The sensor data may be forwarded to the server or cloud node via a set of intermediary, and in some cases mobile (or roving), electronic data collectors. In some cases, the sensor data may be initially collected from the IoT devices by one or more mobile sensor readers carried by one or more vehicles that serve another purpose, such as trash collection or mail/package delivery. As the vehicles carrying the mobile sensor readers drive past or near electronic data collectors carried by other vehicles (or located at particular sites), the sensor data may in some cases be forwarded to the electronic data collectors. In some cases, the sensor data may only be transferred from one node (e.g., a mobile sensor reader or electronic data collector) to another node (e.g., another electronic data collector) when a set of one or more conditions is met, as determined by parameters (e.g., priorities) of the forwarding device, the receiving device, and/or the sensor data.

More specifically, a mobile sensor reader for IoT devices is described. The mobile sensor reader may include a wireless communications system, a memory configured to store sensor data received via the wireless communications system from an IoT device, and a processor. The processor may be configured to monitor for remote electronic data collectors that come within a communication range of the wireless communications system as at least one of the mobile sensor reader or one of the remote electronic data collectors move to different locations; determine a first parameter of a remote electronic data collector that has come within the communication range of the wireless communications system; determine a second parameter of the mobile sensor reader or the sensor data; and forward the sensor data to the remote electronic data collector, via the wireless communications system, at least partly in response to the first parameter and the second parameter satisfying a set of one or more conditions.

An electronic data collector for storing and forwarding sensor data is also described. The electronic data collector may include a wireless communications system, a memory configured to store sensor data, and a processor. The processor may be configured to monitor for mobile electronic data collectors that come within a communication range of the wireless communications system; determine a mobile electronic data collector that has come within the communication range of the wireless communications system has sensor data to forward; determine a first parameter of the mobile electronic data collector or the sensor data; determine a second parameter of the electronic data collector; and receive the sensor data via the wireless communications system and store the sensor data in the memory, at least partly in response to the first parameter and the second parameter satisfying a set of one or more conditions.

Also described is an IoT device. The IoT device may include a wireless communications interface, a sensor, a memory configured to store sensor data acquired by the sensor, and a processor. The processor may be configured to assign a priority to the sensor data; monitor for mobile sensor readers that come within a communication range of the wireless communications interface; determine that a mobile sensor reader has come within the communication range of the wireless communications interface; and forward the sensor data, along with an indicator of the priority and via the wireless communications interface, to the mobile sensor reader.

BRIEF DESCRIPTION OF THE DRAWINGS

The disclosure will be readily understood by the following detailed description in conjunction with the accompanying drawings, wherein like reference numerals designate like structural elements.

Figure 1:
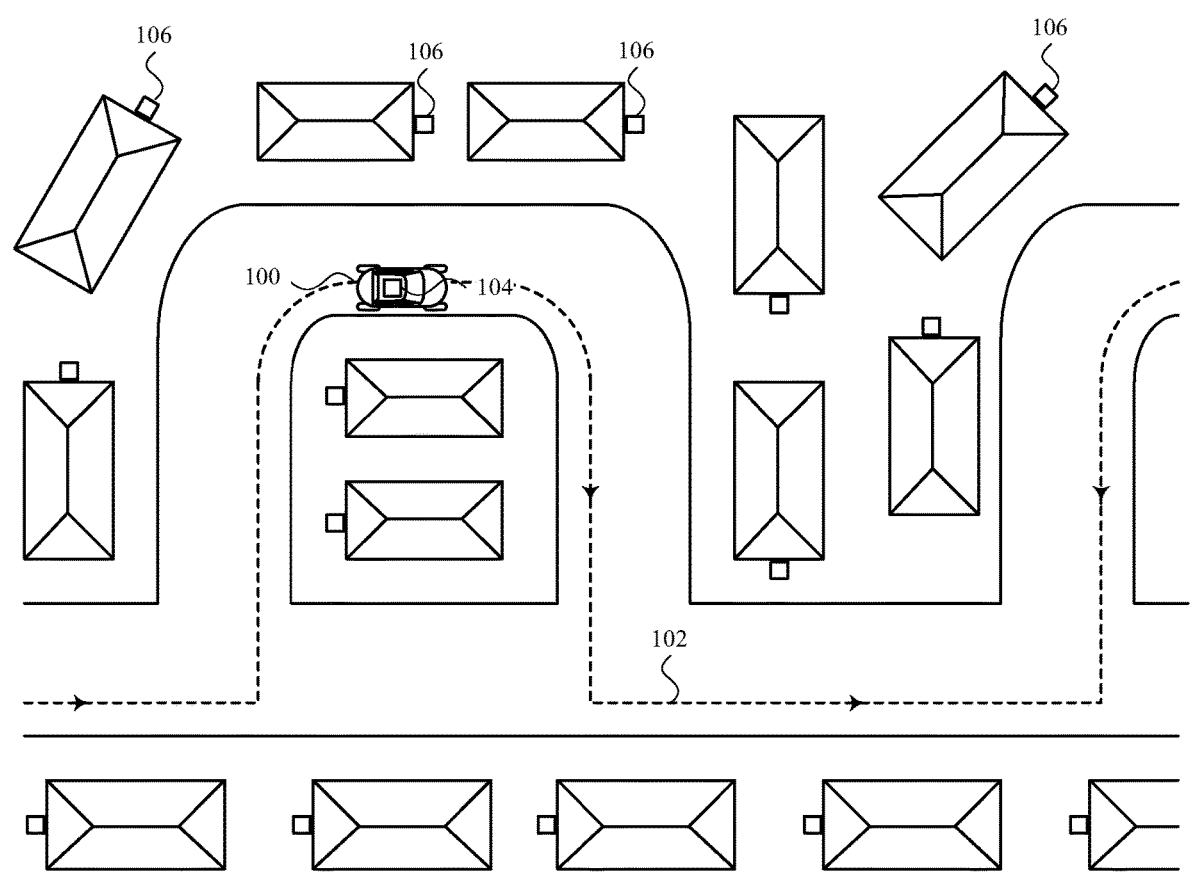
FIG. 1 shows a plan view of a vehicle traveling along a route.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Systems, methods, devices, and apparatus described herein enable sensor data to be wirelessly read (collected) from IoT devices and forwarded, in non-real-time, to a server or cloud node. The sensor data may be forwarded to the server or cloud node via a set of intermediary, and in some cases mobile (or roving), electronic data collectors. In some cases, the sensor data may be initially collected from the IoT devices by one or more mobile sensor readers carried by one or more vehicles that serve another purpose, such as trash collection or mail/package delivery. As the vehicles carrying the mobile sensor readers drive past or near electronic data collectors carried by other vehicles (or located at particular sites), the sensor data may in some cases be forwarded to the electronic data collectors. In some cases, the sensor data may only be transferred from one node (e.g., a mobile sensor reader or electronic data collector) to another node (e.g., another electronic data collector) when a set of one or more conditions is met, as determined by parameters (e.g., priorities) of the forwarding device, the receiving device, and/or the sensor data. In some cases, sensor data may be forwarded from a mobile sensor reader or first electronic data collector, to a second electronic data collector, when the evaluated parameter(s) suggest that the forwarding will result in the sensor data arriving to a data collection node (e.g., a server or cloud node) faster or safer than if the sensor data were not forwarded.

In some embodiments, the IoT devices may include meters, such as gas meters, electricity meters, or water meters installed at one or more residences or businesses. In some embodiments, the IoT devices may be installed at different locations in or around one or more factories, on a military base or at other military site(s), in an oil field or at various oil drilling or pumping locations, and so on.

The systems, methods, devices, and apparatus described herein may enable a municipality, military unit, factory or oil well operator, and so on to collect sensor data at low cost, with a network having a transient footprint.

FIG. 1 shows a plan view of a vehicle 100 traveling along a route 102. As the vehicle 100 travels along the route 102, a mobile sensor reader 104 installed in or otherwise carried by the vehicle 100 may wirelessly collect sensor data from a set of IoT devices 106 located within wireless communication range of the mobile sensor reader 104.

In some cases, the vehicle 100 may be primarily used to provide a service unrelated to sensor data collection, such as trash collection or mail/package pickup and delivery. In such cases, the vehicle 100 may be outfitted with a mobile sensor reader 104 configured to collect sensor data because the vehicle has a route that passes by many locations (e.g., residences, businesses, oil wells, and so on) from which sensor data needs to be collected. By way of example, the vehicle 100 is shown to be a wheeled vehicle (e.g., a truck). In other embodiments, the vehicle 100 could be an unmanned aerial vehicle (UAV), such as a drone, or take other forms.

The route 102 may include a set of streets 110 along which the IoT devices 106 are located. In some embodiments, the IoT devices 106 may include meters, such as gas meters, electricity meters, water meters, or the like installed at a set of residences (e.g., houses, condos, or apartments) or businesses. In these cases, the sensor data may include meter readings. In other cases, the IoT devices may include temperature sensors, rain sensors, weather sensors, ultraviolet (UV) sensors, particulate matter concentration sensors, traffic sensors, or other forms of sensors.

In some cases, the mobile sensor reader 104 may be more integrated with the vehicle 100. For example, the vehicle may include a vehicular transport system (e.g., a transmission and wheels, or a motor and one or more propellers) and a navigation system, and a processor of the vehicle or mobile sensor reader (which may be the same processor or different processors) may control both sensor data collection functions and vehicular transport system and/or navigation system functions. In some cases, the mobile sensor reader 104 may be less integrated with the vehicle 100. For example, the mobile sensor reader 104 may be a device that an operator or rider of the vehicle 100 carries into the vehicle 100 and 1) connects to the vehicle, 2) places in a storage compartment or on the seat of the vehicle 100, or 3) wears or personally carries.

In some cases, a processor of the mobile sensor reader 104 may operate a wireless communications system of the mobile sensor reader 104 to transmit (e.g., broadcast) a beacon. The beacon may be transmitted with a predetermined or configurable periodicity, or upon the occurrence of certain events (e.g., when the vehicle 100 starts or stops moving, or after the vehicle 100 has moved a predetermined or configurable distance). IoT devices 106 that receive the beacon may associate with the mobile sensor reader 104 and transmit sensor data in response to receiving the beacon. In some cases, a processor of the mobile sensor reader 104 may operate a wireless communications system of the mobile sensor reader 104 to listen for beacons transmitted (e.g., broadcast) by IoT devices 106. The beacons may be transmitted with predetermined or configurable periodicities, or upon the occurrence of certain events (e.g., when the vehicle 100 or another vehicle carrying a mobile sensor reader is expected to be in the vicinity of the IoT device 106, or when the IoT device 106 has not been read within a predetermined or configurable amount of time). Upon receiving a beacon from an IoT device 106, the mobile sensor reader 104 may request the IoT device to transmit sensor data to the mobile sensor reader 104.

The wireless communications between the mobile sensor reader 104 and the IoT devices 106 may be more or less complex, and more or less secure. For example, in some cases, the beacon transmitted by an IoT device 106 may include sensor data and/or other parameters. The beacon may be encrypted or unencrypted. In some cases, the mobile sensor reader 104 may establish a secure channel with an IoT device 106, and then the IoT device 106 may transmit sensor data and/or other parameters over the secure channel. Communication between the mobile sensor reader 104 and an IoT device 106 may also be established in other ways, and may be more or less secure.

The sensor data read from each IoT device may be associated with various parameters, including parameters that indicate, for example, an IoT identifier, a sensor identifier, an IoT device location, a sensor location, a sensor data type, a sensor data priority, and so on. The various parameters may be read from an IoT device 106 contemporaneously with sensor data. Alternatively, one or more of the parameters may be assigned by the mobile sensor reader 104. For example, if an IoT device 106 does not provide an IoT device location with its sensor data, the mobile sensor reader 104 may determine an approximate location of the IoT device 106 from a global positioning system (GPS) or other navigation system aboard the vehicle 100. As another example, if an IoT device 106 does not provide a sensor data priority with its sensor data, the mobile sensor reader 104 may assign the sensor data a default priority, or a priority associated with nearby or otherwise similar sensor data readings.

In some cases, sensor data acquired from multiple IoT devices 106 may be aggregated. In some cases, sensor data of a same or similar sensor data type may be aggregated, but sensor data of different sensor data types may not be aggregated. Aggregation may in some cases enable the sensor data to be more easily forwarded to a data collection node or intermediary electronic data collector, or may different types of sensor data to be more easily forwarded to different data collection nodes or intermediary electronic data collectors.

By reading sensor data using a vehicle that is primarily used for another purpose (e.g., trash collection or mail/package pickup and delivery), efficiencies in time, cost, and labor can be achieved, because one vehicle is used for two purposes. In some cases, sensor data collected by the mobile sensor reader 104 may be downloaded directly to a data collection node located at a depot or parking lot to which the vehicle 100 periodically returns (e.g., at the end of the day). The data collection node may, for example, upload the sensor data to a data repository, forward the sensor data over a network, aggregate the sensor data with other sensor data, analyze or trend the sensor data, and so on. In other cases, sensor data collected by the mobile sensor reader 104 may be forwarded to the data collection node (e.g., the server or cloud node) via one or more intermediary electronic data collectors, as shown for example with reference to FIGS. 2-4.

When the data collection node, a computer connected thereto, or an operator determines that sensor data has not been collected from a particular IoT device (or set of IoT devices) for a predetermined or configurable period of time, the data collection node, computer, or operator may instruct the vehicle 100, an operator thereof, or a specially-deployed sensor data collection vehicle to drive or fly by the IoT device(s) for purposes of collecting sensor data. If need be, an operator of the vehicle may repair the IoT device(s).

In some cases, an IoT device 106 may not only forward sensor data to the mobile sensor reader 104, but may also or alternatively receive instructions from the mobile sensor reader 104. For example, an IoT device 106 may receive a parameter setting (e.g., a priority setting), a software update, instructions to change the timing or duty cycle that it uses for monitoring for beacons, and so on.

Figure 2:
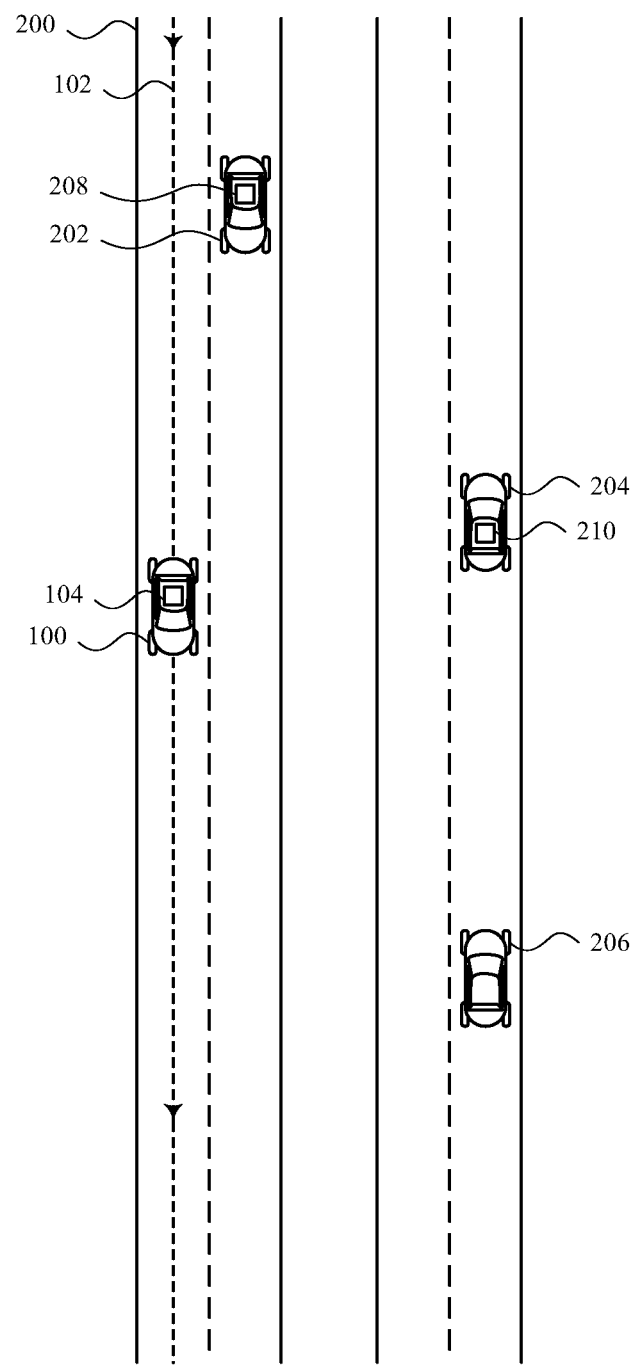
FIG. 2 shows a first example continuation of the route described with reference to FIG. 1.
Figure 3:
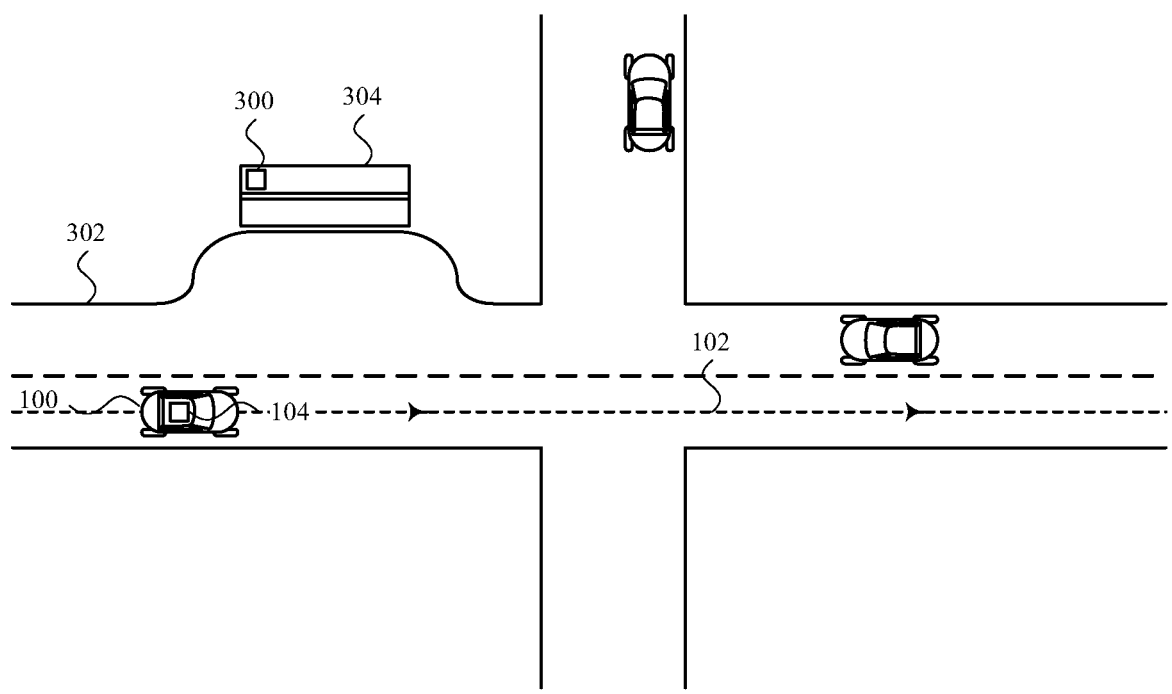
FIG. 3 shows a second example continuation of the route described with reference to FIG. 1.
Figure 4:
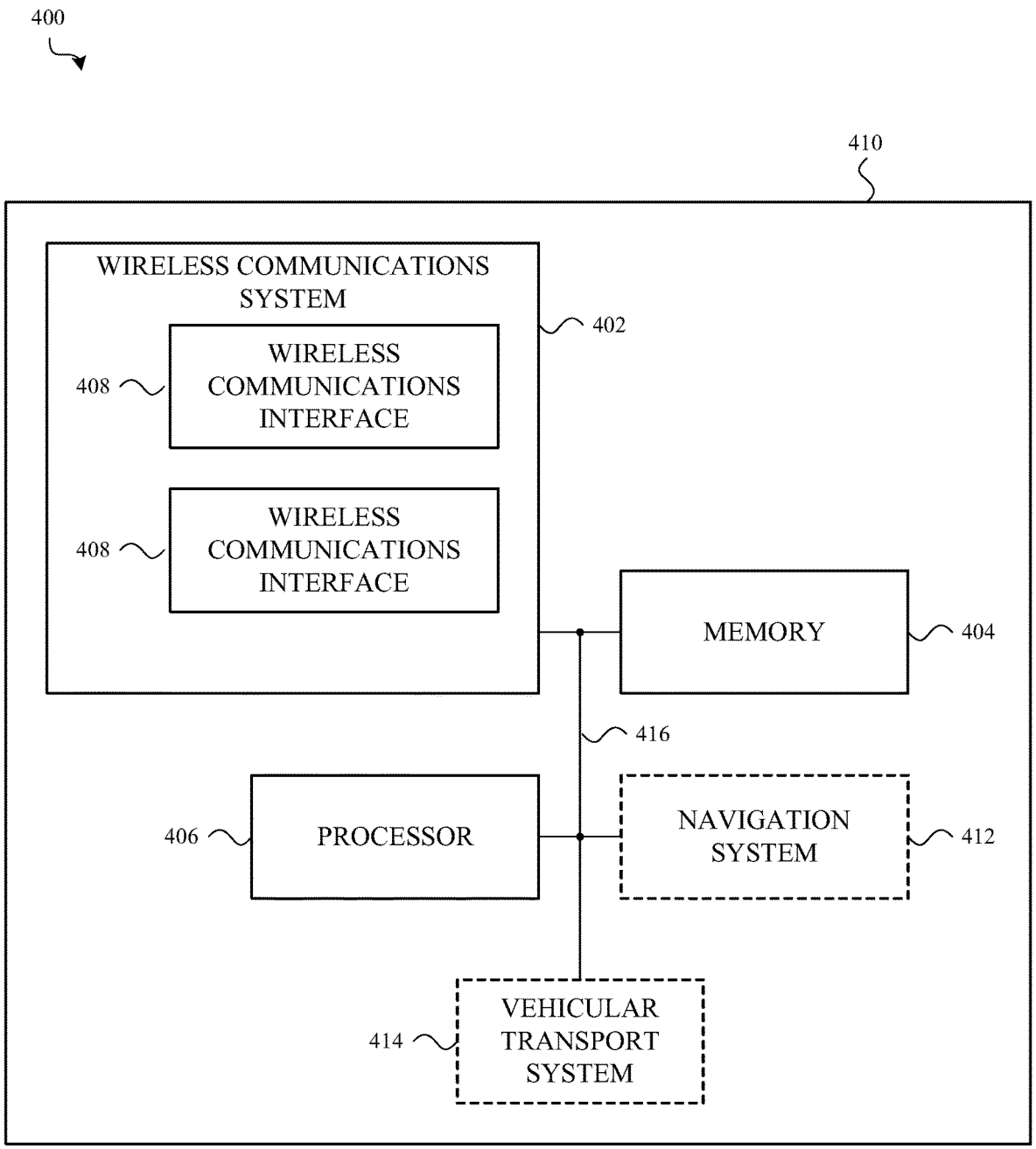
FIG. 4 shows an example block diagram of a mobile sensor reader.

Each of FIGS. 2-4 show an example continuation of the route 102 described with reference to FIG. 1. FIG. 2 shows a first example continuation of the route 102 described with reference to FIG. 1. In contrast to the portion of the route 102 described with reference to FIG. 1, the portion of the route 102 shown in FIG. 2 shows the vehicle 100 on a more heavily-traveled street 200, where the vehicle 100 is more likely to pass, be passed, or otherwise come near other vehicles 202, 204, 206.

As vehicles 202, 206 with on-board wireless communications systems pass or otherwise come within a communication range of the vehicle 100, the vehicle 100 may, in some cases, forward sensor data that its mobile sensor reader 104 has collected to a remote electronic data collector 208 aboard one of the other vehicles 202, 206. The sensor data may be forwarded, for example, in an effort to move the sensor data more quickly toward a data collection node (e.g., a server or cloud node). In some cases, different portions of the collected sensor data may be forwarded to different remote data collectors aboard different vehicles 202, 206.

In some embodiments, a processor of the mobile sensor reader 104 may be configured to monitor for remote electronic data collectors 208, 210 that come within a communication range of the wireless communications system of the mobile sensor reader 104. The monitoring may occur as at least one of the mobile sensor reader 104 or one of the remote electronic data collectors 208, 210 move to different locations. The monitoring may also occur while the mobile sensor reader 104 is temporarily at a fixed location, and/or while one or more of the remote data collectors 208, 210 is temporarily or permanently at a fixed location.

When a remote electronic data collector 208 or 210 comes within the communication range of the wireless communications system of the mobile sensor reader 104, the processor of the mobile sensor reader 104 may determine at least one parameter (e.g., at least one parameter including a first parameter) of the remote electronic data collector 208 or 210. The processor may also determine at least one parameter (e.g., at least one parameter including a second parameter) of the mobile sensor reader 104 and/or its collected sensor data. At least partly in response to the first parameter and the second parameter satisfying a set of one or more conditions, the processor may wirelessly forward part or all of its collected sensor data to the remote electronic data collector 208 or 210. Some examples of this sort of forwarding are provided below.

In some examples, the first parameter may be a first priority of a remote electronic data collector 208 or 210, and the second parameter may be a second priority of the mobile sensor reader 104. Each of the priorities may be based, for example, on whether the device is a data collector or sensor reader, on the type of vehicle that carries the remote electronic data collector 210 or mobile sensor reader 104, on the route of a vehicle 202, 206, or 100, on the primary purpose and/or owner of the vehicle 202, 206, or 100, on a direction of the vehicle 202, 206, or 100 or an endpoint of its route, and so on. In some cases, the processor of the mobile sensor reader 104 may be configured to compare the first priority to the second priority, and the set of one or more conditions used to determine whether sensor data should be forwarded may include the first priority being greater than the second priority. Thus, for example, when a remote electronic data collector 208 or 210 has a higher priority than the mobile sensor reader 104, by virtue of the remote electronic data collector 208 or 210 being headed in the direction of, or returning more quickly to, a data collection node the mobile sensor reader 104 may forward part or all of its sensor data to the remote electronic data collector 208 or 210.

In some examples, the first parameter may be a first priority of a remote electronic data collector 208 or 210, and the second parameter may be a second priority of the sensor data (e.g., of a particular piece of sensor data, or of an aggregated quantity of sensor data). The priority of the sensor data may be based, for example, on the timing sensitivity of the sensor data (e.g., a length of time from a last reading, or a length of time to the end of a billing cycle), the type of sensor data, the owner of the property from which the sensor data was acquired, and so on. In these examples, the processor of the mobile sensor reader 104 may be configured to compare the first priority to the second priority. In other cases, the processor may be configured to determine whether each of the priorities is within a respective range, or otherwise determine whether the first and second priorities satisfy a set of one or more conditions. The processor may forward sensor data to the remote electronic data collector 208 or 210 when the set of one or more conditions, based at least partly on the first and second parameters, is satisfied.

In some examples, the first parameter may be a type of vehicle that carries the remote electronic data collector 208 or 210, and the second parameter may be a type of sensor data. In these examples, the processor of the mobile sensor reader 104 may be configured to determine whether the first and second parameters satisfy a set of one or more conditions. Again, the processor may forward sensor data to the remote electronic data collector 208 or 210 when the set of one or more conditions, based at least partly on the first and second parameters, is satisfied.

The parameter(s) of a remote electronic data collector 208 or 210 and mobile sensor reader 104 that need to satisfy a set of one or more conditions may vary, and may in some cases include multiple parameters. Generally, the parameter(s) may be selected, for example, to efficiently move sensor data from IoT devices to data collection nodes, or for safekeeping of the sensor data, or for other purposes.

In some cases, the processor of the mobile sensor reader 104 may determine a parameter (or parameters) of a first remote electronic data collector 208 that has come within the communication range of the wireless communications system of the mobile sensor reader 104, and may refrain from forwarding sensor data to the first remote electronic data collector 208 in response to the parameter(s) of the first remote electronic data collector 208 and the mobile sensor reader 104 not satisfying the set of one or more conditions. Subsequently, the processor may determine a parameter (or parameters) of a second remote electronic data collector 210 that has come within range of the wireless communications system and forward sensor data to the second remote electronic data collector 210 in response to the parameter(s) of the second remote electronic data collector 210 and the mobile sensor reader 104 satisfying the set of one or more conditions.

In some cases, the processor of the mobile sensor reader 104 may forward aggregated sensor data (e.g., aggregated first sensor data, second sensor data, and so on, acquired from a first IoT device, a second IoT device, and so on (or acquired from a first sensor, a second sensor, and so on)) to a remote electronic data collector 208 or 210. In some cases, the processor may forward different sensor data to different remote electronic data collectors. For example, sensor data having a first sensor data type may be forwarded to a first remote electronic data collector 208, and sensor data having a second sensor data type may be forwarded to a second remote electronic data collector 210.

In some embodiments, an electronic data collector, such as the remote electronic data collector 208 or 210, may also or alternatively perform some of the operations performed by the mobile sensor reader 104. For example, a processor of the remote electronic data collector 210 may monitor for mobile electronic data collectors (e.g., the mobile sensor reader 104) that come within a communication range of a wireless communications system of the remote electronic data collector 210. When the mobile sensor reader 104 comes within the communication range of the wireless communications system of the remote electronic data collector 210, the processor of the remote electronic data collector 210 may determine whether the mobile sensor reader 104 (a mobile electronic data collector) has sensor data to forward. If so, the processor may determine at least one parameter (e.g., at least one parameter including a first parameter) of the mobile sensor reader 104 and/or its collected sensor data. The processor may also determine at least one parameter (e.g., at least one parameter including a second parameter) of the remote electronic data collector 210. At least partly in response to the first parameter and the second parameter satisfying a set of one or more conditions, the processor may wirelessly receive part or all of the sensor data collected by the mobile sensor reader 104.

In some cases, the operations described with reference to FIG. 2 may occur while the vehicle 100 is traveling the portion of the route 102 described with reference to FIG. 1.

An electronic data collector 208 or 210 that receives sensor data from another electronic data collector (e.g., from the mobile sensor reader 104 or another type of electronic data collector) may forward the sensor data to yet another electronic data collector. For example, a processor of the electronic data collector 210 (a first electronic data collector) may determine that a second electronic data collector has come within the communication range of a wireless communications system of the first electronic data collector 210, and may forward sensor data to the second electronic data collector similarly to how the sensor data was forwarded to (or received by) the first electronic data collector 210. For example, after receiving sensor data from the mobile sensor reader 104 and determining that the second electronic data collector has come within communication range, a processor of the first electronic data collector 210 may determine one or more parameters of the second electronic data collector, and may forward sensor data to the second electronic data collector, via its wireless communications system, at least partly in response to the parameter(s) of the second electronic data collector and parameter(s) of the first electronic data collector satisfying a set of one or more conditions. The set of one or more conditions may be the same as, or different from, the set of one or more conditions that needed to be satisfied to transfer the sensor data from the mobile sensor reader 104 to the first electronic data collector.

In some embodiments, an electronic data collector 208 or 210 may receive sensor data from multiple other electronic data collectors (e.g., multiple mobile sensor readers 104, multiple other types of electronic data collector, or a mix of mobile sensor readers 104 and other types of electronic data collector). Each of the electronic data collectors may be mobile or have a fixed position, and each forwarding or reception of sensor data may be made in response to a determination that parameters of the electronic data collectors and/or their collected sensor data satisfy a set of one or more conditions (e.g., a set of one or more conditions including a priority relationship). In some cases, sensor data may be received from different electronic data collectors in response to satisfying different sets of one or more conditions. The forwarded sensor data may be all of an electronic data collector's sensor data, or different pieces of sensor data may be forwarded to different other electronic data collectors based, for example, on the parameters (e.g., priorities) of the electronic data collectors involved in a transfer. In some cases, an electronic data collector may aggregate sensor data before forwarding it to another electronic data collector. For example, an electronic data collector may aggregate sensor data received from two or more (multiple) other electronic data collectors. In some cases, sensor data may be aggregated because it has the same sensor data type. In some cases, sensor data may be aggregated for other reasons, including, for example, just because it is sensor data.

FIG. 3 shows a second example continuation of the route described with reference to FIG. 1. The portion of the route 102 shown in FIG. 3 shows the vehicle 100 passing by a stationary electronic data collector 300 along a street 302. The mobile sensor reader 104 may forward sensor data to the stationary electronic data collector 300 similarly to how it may forward sensor data to one of the remote electronic data collectors described with reference to FIG. 2. The stationary electronic data collector 300 may, in turn, forward collected sensor data to another mobile electronic data collector that temporarily moves within the communication range of the stationary electronic data collector 300.

In some cases, the stationary electronic data collector 300 may be positioned near an area that mobile electronic data collectors of higher priority are likely to frequent. For example, the stationary electronic data collector 300 may be positioned near a bus stop 304 or train depot where public transportation vehicles (buses or trains) carrying mobile electronic data collectors frequently stop.

FIG. 4 shows an example block diagram of a mobile sensor reader 400. The mobile sensor reader 400 is an example of the mobile sensor reader and electronic data collectors described with reference to FIGS. 1-3. The mobile sensor reader 400 may include a wireless communications system 402, a memory 404, and a processor 406.

The wireless communications system 402 may include one or more wireless communications interfaces 408 operated in accordance with one or more wireless communications protocols, such as a wireless local area network (WLAN) protocol (e.g., an Institute of Electrical and Electronics Engineers (IEEE) 802.11 protocol, such as an IEEE 802.11b or 802.11n protocol), a BLUETOOTH® protocol, a cellular communications protocol (e.g., a Third Generation Partnership Project (3GPP) Fifth Generation New Radio (5G NR) protocol, a 3GPP Fourth Generation (4G or Long Term Evolution (LTE)) protocol, or a 3GPP Third Generation (3G) protocol), and so on. In some cases, the same wireless communications interface(s) may be used for communicating with IoT devices and electronic data collectors. In other cases, a first wireless communications interface (or first set of wireless communications interfaces) operated in accordance with a first wireless communications protocol (or first set of wireless communications protocols) may be used to communicate with IoT devices (e.g., to receive sensor data from IoT devices), and a second wireless communications interface (or second set of wireless communications interfaces) operated in accordance with a second wireless communications protocol (or second set of wireless communications protocols) may be used to communicate with electronic data collectors (e.g., to forward sensor data to a remote electronic data collector). In some embodiments, the first set of wireless communications protocols may include an IEEE 802.11b or 802.11n protocol, and the second set of wireless communications protocols may include a cellular communications protocol. Some or all of the wireless communications interfaces 408 may share an antenna, or one or more of the wireless communications interfaces 408 may each have their own dedicated antenna.

The memory 404 may be configured to store sensor data received via the wireless communications system from one or more IoT devices (e.g., first, second, and/or additional IoT devices). The memory 404 may include, for example, cache memory or other non-persistent memory and/or permanent or other persistent memory. The memory 404 may be in communication with the processor 406 and may be configured to store instructions that, when executed by the processor 406, cause the processor 406 to perform various operations as described herein.

The processor 406 may take various forms and may include one or more of an integrated circuit (IC), a discrete circuit, an application-specific integrated circuit (ASIC), a System-on-Chip (SoC), a microcontroller, a peripheral interface controller (PIC), and so on. The processor 406 may be configured to perform various operations, some of which are described with reference to FIGS. 1-3.

The mobile sensor reader 400 may have a housing 410 that houses or carries part or all of the wireless communications system 402, memory 404, processor 406, and/or other components. In some cases, the housing may take the form of a handheld device. In some cases, the housing may take the form of a vehicle housing, such as a vehicle housing that defines one of a trash truck, a mail delivery vehicle, or a package delivery vehicle. In these latter cases, the mobile sensor reader 400 may include a navigation system 412 and vehicular transport system 414 housed (or carried) by the housing 410. The vehicular transport system may contain, for example, a transmission and wheels (e.g., when the vehicle is a car or truck), or a motor and one or more propellers (e.g., when the vehicle is a UAV). In some embodiments, the processor 406 may operate one or both of the navigation system 412 or vehicular transport system 414.

The wireless communications system 402, memory 404, processor 406, navigation system 412, and vehicular transport system 414 may be interconnected and/or communicate with each other in various ways. For example, the wireless communications system 402, memory 404, processor 406, navigation system 412, and vehicular transport system 414 may be connected to one another by one or more buses 416.

Figure 5:
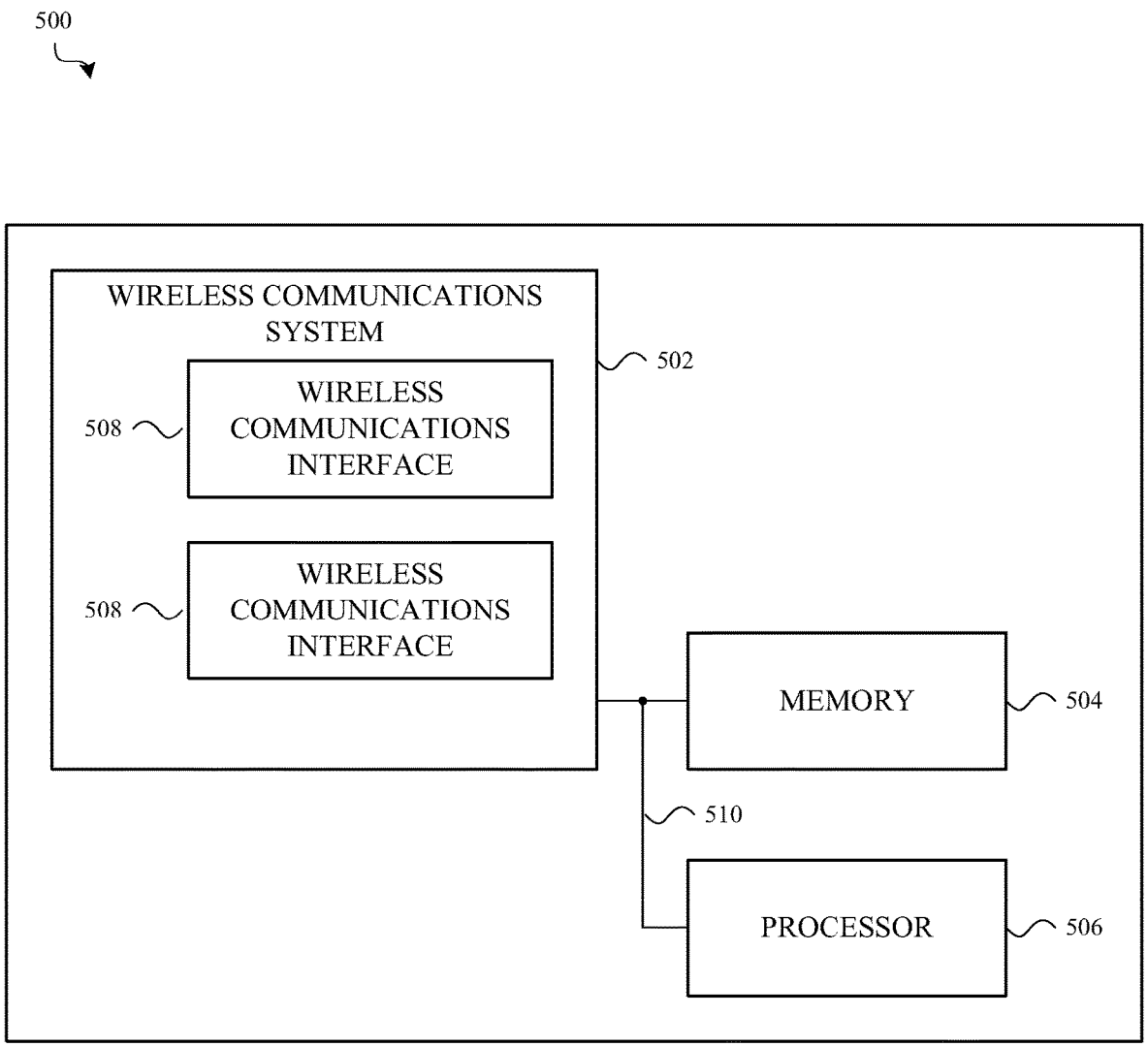
FIG. 5 shows an example block diagram of an electronic data collector for storing and forwarding sensor data.

FIG. 5 shows an example block diagram of an electronic data collector 500 for storing and forwarding sensor data. The electronic data collector 500 is an example of the electronic data collectors (e.g., the remote electronic data collectors, mobile electronic data collectors, stationary electronic data collectors, and so on) described with reference to FIGS. 1-3. The electronic data collector 500 may include a wireless communications system 502, a memory 504, and a processor 506.

The wireless communications system 502 may include one or more wireless communications interfaces 508 operated in accordance with one or more wireless communications protocols, such as a WLAN protocol (e.g., an IEEE 802.11 protocol, such as an IEEE 802.11b or 802.11n protocol), a BLUETOOTH® protocol, a cellular communications protocol (e.g., a 3GPP 5G NR protocol, a 3GPP 4G or LTE protocol, or a 3GPP 3G protocol), and so on. Some or all of the wireless communications interfaces 508 may share an antenna, or one or more of the wireless communications interfaces 508 may each have their own dedicated antenna.

The memory 504 may be configured to store sensor data received via the wireless communications system from one or more other electronic data collectors (e.g., first, second, and/or additional electronic data collectors). The memory 504 may include, for example, cache memory or other non-persistent memory and/or permanent or other persistent memory. The memory 504 may be in communication with the processor 506 and may be configured to store instructions that, when executed by the processor 506, cause the processor 506 to perform various operations as described herein.

The processor 506 may take various forms and may include one or more of an IC, a discrete circuit, an ASIC, an SoC, a microcontroller, a PIC, and so on. The processor 406 may be configured to perform various operations, some of which are described with reference to FIGS. 1-3.

The wireless communications system 502, memory 504, and processor 506 may be interconnected and/or communicate with each other in various ways. For example, the wireless communications system 502, memory 504, and processor 506 may be connected to one another by one or more buses 510.

Figure 6:
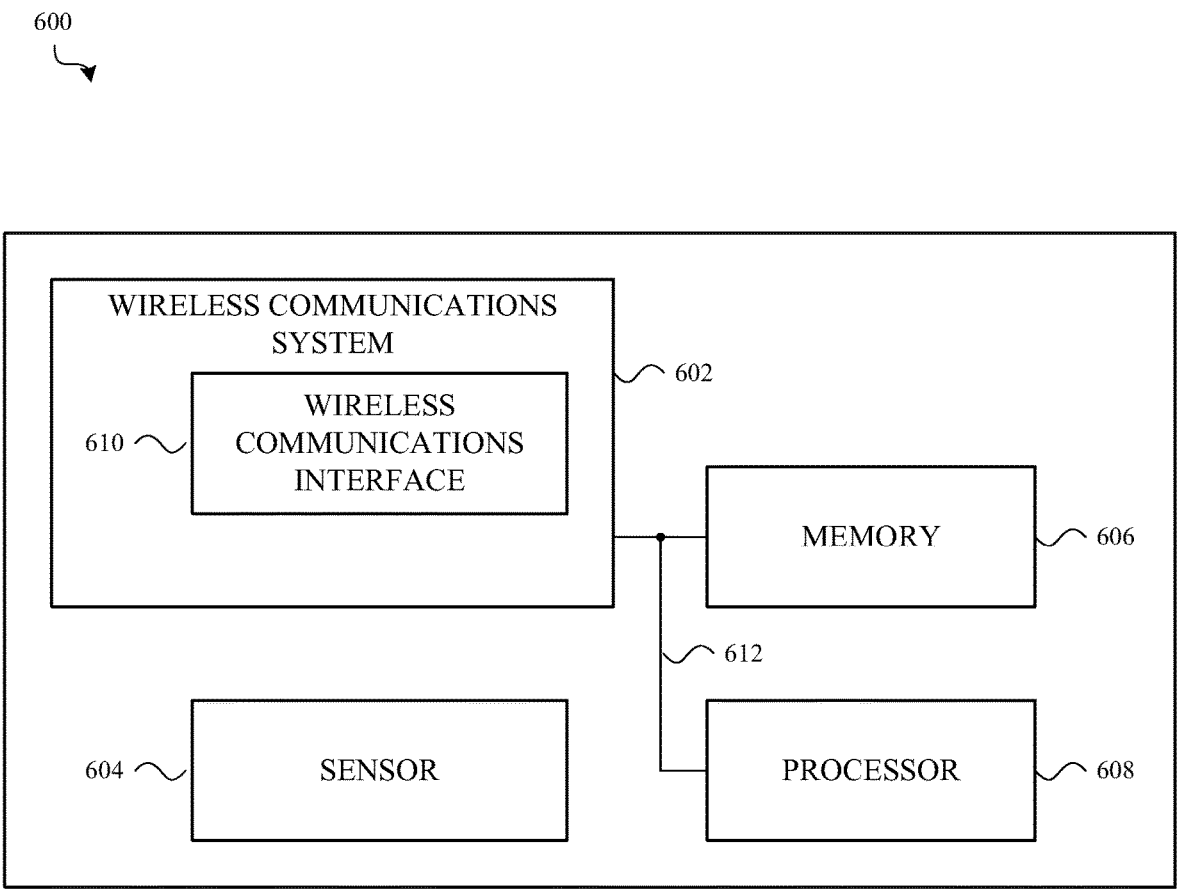
FIG. 6 shows an example block diagram of an IoT device.

FIG. 6 shows an example block diagram of an IoT device 600. The IoT device 600 is an example of the IoT devices described with reference to FIGS. 1-3. The IoT device 600 may include a wireless communications interface 602, a sensor 604, a memory 606, and a processor 608.

The wireless communications interface 602 may include one or more wireless communications interfaces 610 operated in accordance with one or more wireless communications protocols, such as a WLAN protocol (e.g., an IEEE 802.11 protocol, such as an IEEE 802.11b or 802.11n protocol), a BLUETOOTH® protocol, and so on. For sake of cost and simplicity, and in some cases, the wireless communications interface 602 may include only one wireless communications interface. The wireless communications interface 602 may be used to forward sensor data acquired by the sensor 604 to a mobile sensor reader.

The sensor 604 may include a meter, such as a gas meter, an electricity meter, a water meter, or the like. In these cases, the sensor data acquired by the sensor 604 may include meter readings. In some cases, the sensor 604 may include one or more of a temperature sensor, rain sensor, weather sensor, UV sensor, particulate matter concentration sensor, traffic sensor, or other form of sensor. The sensor 604 may be a single parameter sensor or a multi-function sensor.

The memory 606 may be configured to store sensor data acquired by the sensor 604. The memory 606 may include, for example, cache memory or other non-persistent memory and/or permanent or other persistent memory. The memory 606 may be in communication with the processor 608 and may be configured to store instructions that, when executed by the processor 608, cause the processor 608 to perform various operations as described herein.

The processor 608 may take various forms and may include one or more of an IC, a discrete circuit, an ASIC, an SoC, a microcontroller, a PIC, and so on. The processor 608 may be configured to perform various operations, some of which are described with reference to FIGS. 1-3.

In some embodiments of the IoT device 600, the processor 608 may be configured to assign a priority or other parameters (e.g., a time stamp, sensor identifier, and so on) to the sensor data acquired by the sensor 604. The priority may be a fixed or programmable priority, and in some cases may be a priority received via the wireless communications interface 602. In some cases, the processor 608 may adjust the priority from time-to-time, and may assign the priority at least partly in response to the timing sensitivity of the sensor data (e.g., a length of time from a last reading (e.g., a length of time since sensor data acquired by the sensor 604 was last forwarded to an electronic data collector); a length of time to (or since) the end of a billing cycle; a length of time since the sensor data was acquired), the type of sensor data, the owner of the property from which the sensor data was acquired, and so on. The assigned priority may determine how or when a mobile sensor reader or other electronic data collector forwards the sensor data to other electronic data collectors or a data collection node. For example, sensor data associated with a higher priority may be forwarded via a fastest data path, possibly using more costly wireless communications interfaces or data networks. Also or alternatively, a high enough priority might cause a mobile sensor reader to trigger an alert to a user or initiate cellular communications to alert a system operator and/or immediately forward the sensor data to a data collection node (e.g., over a cellular communications channel).

The processor 608 may monitor for mobile sensor readers that come within a communication range of the wireless communications interface 602. In some cases, the processor 608 may cause the wireless communications interface 602 to periodically wake (e.g., transition from a lower power state or sleep state, to a higher power state or active state) and listen for beacons transmitted by mobile sensor readers. For example, the processor 608 may cause the wireless communications interface 602 to periodically wake in accordance with a duty cycle. In some cases, the processor 608 may only monitor for mobile sensor readers at particular times, such as a day that trash is normally scheduled to be picked up from the residence where the IoT device 600 is installed.

Upon determining that a mobile sensor reader has come within the communication range of the wireless communications interface, the processor 608 may associate with the mobile sensor reader and forward the sensor data, along with an indicator of the priority of the sensor data and/or other parameters, to the mobile sensor reader. The sensor data and parameter(s) may be forwarded to the mobile sensor reader via the wireless communications interface 602.

The wireless communications interface 602, sensor 604, memory 606, and processor 608 may be interconnected and/or communicate with each other in various ways. For example, the wireless communications interface 602, sensor 604, memory 606, and processor 608 may be connected to one another by one or more buses 612.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, used specific nomenclature to provide a thorough understanding of the described embodiments. However, it will be apparent to one skilled in the art that the specific details are not required in order to practice the described embodiments.

Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A mobile sensor reader for Internet of Things (IoT) devices, comprising:
a wireless communications system;
a memory configured to store sensor data received via the wireless communications system from an IoT device; and
a processor configured to,
monitor for remote electronic data collectors that come within a communication range of the wireless communications system as at least one of the mobile sensor reader or one of the remote electronic data collectors move to different locations;
determine a first priority of a remote electronic data collector that has come within the communication range of the wireless communications system;
determine a second priority of the mobile sensor reader;
compare the first priority to the second priority; and
forward the sensor data to the remote electronic data collector, via the wireless communications system, at least partly in response to the first priority being greater than the second priority.

2. The mobile sensor reader of claim 1, wherein:
the IoT device is a first IoT device and the sensor data is first sensor data; and
the memory is further configured to store at least second sensor data received via the wireless communications system from at least a second IoT device.

3. The mobile sensor reader of claim 2, wherein:
the processor is configured to,
aggregate the first sensor data and the second sensor data; and
forward the aggregated first sensor data and second sensor data to the remote electronic data collector, via the wireless communications system, at least partly in response to the first priority being greater than the second priority.

4. The mobile sensor reader of claim 1, wherein:
the remote electronic data collector is a first remote electronic data collector;
the processor is configured to, prior to forwarding the sensor data to the first remote electronic data collector,
determine a third priority of a second remote electronic data collector that has come within the communication range of the wireless communications system; and
refrain from forwarding the sensor data to the second remote electronic data collector in response to the first priority being greater than the third priority.

5. The mobile sensor reader of claim 1, further comprising:
a navigation system; and
a vehicular transport system carrying the wireless communications system, the memory, the processor, and the navigation system; wherein,
the processor is configured to receive, via the wireless communications system, instructions for operating at least one of the navigation system or the vehicular transport system.

6. The mobile sensor reader of claim 5, further comprising:
a vehicle housing defining one of a trash truck or a mail or package delivery vehicle.

7. The mobile sensor reader of claim 1, wherein:
the processor is configured to,
operate the wireless communications system to transmit a beacon; and
receive the sensor data in response to transmitting the beacon.

8. The mobile sensor reader of claim 1, wherein the sensor data comprises a meter reading.

9. The mobile sensor reader of claim 1, wherein:
the wireless communications system includes,
a first wireless communications interface operated in accordance with a first wireless communications protocol; and
a second wireless communications interface operated in accordance with a second wireless communications protocol different from the first wireless communications protocol;
the first wireless communications interface is configured to receive the sensor data; and
the second wireless communications interface is configured to forward the sensor data to the remote electronic data collector.

10. An electronic data collector for storing and forwarding sensor data, comprising:
a wireless communications system; and
a memory configured to store sensor data; and
a processor configured to,
monitor for mobile electronic data collectors that come within a communication range of the wireless communications system;
determine a mobile electronic data collector that has come within the communication range of the wireless communications system has sensor data to forward;
determine a first priority of the mobile electronic data collector;
determine a second priority of the electronic data collector;
compare the first priority to the second priority; and
receive the sensor data via the wireless communications system and store the sensor data in the memory, at least partly in response to the second priority being greater than the first priority.

11. The electronic data collector of claim 10, wherein:
the mobile electronic data collector is a first mobile electronic data collector; and
the processor is configured to,
determine a second mobile electronic data collector has come within the communication range of the wireless communications system;
determine a third priority of the second mobile electronic data collector; and
forward the sensor data to the second mobile electronic data collector, via the wireless communications system, at least partly in response to the third priority being greater than the second priority.

12. The electronic data collector of claim 10, wherein:
the mobile electronic data collector is a first mobile electronic data collector; and
the electronic data collector is a second mobile electronic data collector.

13. The electronic data collector of claim 10, wherein:
the mobile electronic data collector is a first mobile electronic data collector and the sensor data is first sensor data; and
the processor is configured to,
   determine a second mobile electronic data collector that has come within the communication range of the wireless communications system has second sensor data to forward;
   determine a third priority of the second mobile electronic data collector;
   receive the second sensor data via the wireless communications system and store the second sensor data in the memory, in response to the second priority being greater than the third priority.

14. The electronic data collector of claim 13, wherein:
the processor is configured to,
   aggregate the first sensor data and the second sensor data; and
   forward the aggregated first sensor data and second sensor data to a third mobile electronic data collector via the wireless communications system.

15. The electronic data collector of claim 13, wherein:
the processor is configured to,
   forward the first sensor data to a third mobile electronic data collector via the wireless communications system; and
   forward the second sensor data to a fourth mobile electronic data collector via the wireless communications system.

* * * * *